(12) United States Patent
Larsen et al.

(10) Patent No.: US 9,851,242 B2
(45) Date of Patent: Dec. 26, 2017

(54) COLLOCATED SENSOR FOR A VIBRATING FLUID METER

(75) Inventors: Christopher George Larsen, Cincinnati, OH (US); Matthew Joseph Rensing, Cincinnati, OH (US); Amy Mai Nilsen, Boulder, CO (US); Roger Scott Loving, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 663 days.

(21) Appl. No.: 14/349,148

(22) PCT Filed: Oct. 26, 2011

(86) PCT No.: PCT/US2011/057859
§ 371 (c)(1),
(2), (4) Date: Apr. 2, 2014

(87) PCT Pub. No.: WO2013/062538
PCT Pub. Date: May 2, 2013

(65) Prior Publication Data
US 2014/0238140 A1    Aug. 28, 2014

(51) Int. Cl.
*G01F 1/84* (2006.01)
*G01H 3/00* (2006.01)

(52) U.S. Cl.
CPC ............ *G01H 3/00* (2013.01); *G01F 1/8422* (2013.01); *G01F 1/8427* (2013.01); *G01F 1/8477* (2013.01); *Y10T 29/49004* (2015.01)

(58) Field of Classification Search
CPC .... A61K 9/0024; A61K 31/765; A61K 31/77; A61K 47/10; A61K 47/34; C08L 71/02; C08L 2666/18; C08L 2666/02; C08G 2261/126
USPC ........................................................... 73/649
See application file for complete search history.

(56) References Cited

U.S. PATENT DOCUMENTS

| | | | | |
|---|---|---|---|---|
| 4,876,898 A | * | 10/1989 | Cage | G01F 1/8409 73/861.355 |
| 6,230,104 B1 | | 5/2001 | Shelley et al. | |
| 2006/0207346 A1 | * | 9/2006 | Van Cleve | G01F 1/8413 73/861.355 |
| 2007/0268014 A1 | * | 11/2007 | Shimomura | F02B 39/16 324/207.16 |
| 2009/0100939 A1 | * | 4/2009 | Lanham | G01F 1/8409 73/861.18 |

(Continued)

FOREIGN PATENT DOCUMENTS

| | | |
|---|---|---|
| GB | 1492767 A | 11/1977 |
| JP | 57-137818 A | 8/1982 |

(Continued)

*Primary Examiner* — J M Saint Surin
(74) *Attorney, Agent, or Firm* — The Ollila Law Group LLC

(57) ABSTRACT

A combined driver and pick-off sensor component (200, 300) for a vibrating meter is provided. The combined driver and pick-off sensor component (200, 300) includes a magnet portion (104B) with at least a first magnet (211). The combined driver and pick-off sensor component (200, 300) further includes a coil portion (204A, 304A) receiving at least a portion of the first magnet (211). The coil portion (204A, 304A) includes a coil bobbin (220), a driver wire (221) wound around the coil bobbin (220), and a pick-off wire (222) wound around the coil bobbin (220).

20 Claims, 4 Drawing Sheets

(56) References Cited

U.S. PATENT DOCUMENTS

2010/0175456 A1* 7/2010 Stack .................... G01F 1/8413
73/1.16
2013/0121376 A1* 5/2013 Mansfield ............. G01F 1/8431
374/170

FOREIGN PATENT DOCUMENTS

| JP | 01-112576 A | 1/1989 |
| JP | 10-301561 A | 11/1998 |
| JP | 2003-227741 A | 8/2003 |
| WO | 9726508 A1 | 7/1997 |
| WO | 0113074 A1 | 2/2001 |
| WO | 2006036139 A1 | 4/2006 |

\* cited by examiner

COLLOCATED SENSOR FOR A VIBRATING FLUID METER

TECHNICAL FIELD

The embodiments described below relate to, vibrating meters, and more particularly, to a collocated sensor for a vibrating fluid meter.

BACKGROUND OF THE INVENTION

Vibrating meters, such as for example, vibrating densitometers and Coriolis flow meters are generally known and are used to measure mass flow and other information for materials within a conduit. The material may be flowing or stationary. Exemplary Coriolis flow meters are disclosed in U.S. Pat. No. 4,109,524, U.S. Pat. No. 4,491,025, and Re. 31,450 all to J. E. Smith et al. These flow meters have one or more conduits of straight or curved configuration. Each conduit configuration in a Coriolis mass flow meter has a set of natural vibration modes, which may be of simple bending, torsional, or coupled type. Each conduit can be driven to oscillate at a preferred mode.

Material flows into the flow meter from a connected pipeline on the inlet side of the flow meter, is directed through the conduit(s), and exits the flow meter through the outlet side of the flow meter. The natural vibration modes of the vibrating, material filled system are defined in part by the combined mass of the conduits and the material flowing within the conduits.

When there is no flow through the flow meter, a driving force applied to the conduit(s) causes all points along the conduit(s) to oscillate with identical phase or a small "zero offset", which is a time delay measured at zero flow. As material begins to flow through the flow meter, Coriolis forces cause each point along the conduit(s) to have a different phase. For example, the phase at the inlet end of the flow meter lags the phase at the centralized driver position, while the phase at the outlet leads the phase at the centralized driver position. Pick-off sensors on the conduit(s) produce sinusoidal signals representative of the motion of the conduit(s). Signals output from the pick-off sensors are processed to determine the time delay between the pick-off sensors. The time delay between the two or more pick-off sensors is proportional to the mass flow rate of material flowing through the conduit(s).

Meter electronics connected to the driver generates a drive signal to operate the driver and determines a mass flow rate and other properties of a material from signals received from the pick-off sensors. The driver may comprise one of many well-known arrangements; however, a magnet and an opposing drive coil have received great success in the vibrating meter industry. Examples of suitable drive coil and magnet arrangements are provided in U.S. Pat. No. 7,287, 438 as well as U.S. Pat. No. 7,628,083, which are both assigned on their face to Micro Motion, Inc. and are hereby incorporated by reference. An alternating current is passed to the drive coil for vibrating the conduit(s) at a desired flow tube amplitude and frequency. It is also known in the art to provide the pick-off sensors as a magnet and coil arrangement very similar to the driver arrangement. However, while the driver receives a current, which induces a motion, the pick-off sensors can use the motion provided by the driver to induce a voltage. The magnitude of the time delay measured by the pick-off sensors is very small; often measured in nanoseconds. Therefore, it is necessary to have the transducer output be very accurate.

FIG. 1 illustrates an example of a prior art vibrating meter 5 in the form of a Coriolis flow meter comprising a sensor assembly 10 and a meter electronics 20. The meter electronics 20 is in electrical communication with the sensor assembly 10 to measure characteristics of a flowing material, such as, for example, density, mass flow rate, volume flow rate, totalized mass flow, temperature, and other information.

The sensor assembly 10 includes a pair of flanges 101 and 101', manifolds 102 and 102', and conduits 103A and 103B. Manifolds 102, 102' are affixed to opposing ends of the conduits 103A, 103B. Flanges 101 and 101' of the prior art Coriolis flow meter are affixed to opposite ends of the spacer 106. The spacer 106 maintains the spacing between manifolds 102, 102' to prevent undesired vibrations in the conduits 103A and 103B. The conduits 103A and 103B extend outwardly from the manifolds in an essentially parallel fashion. When the sensor assembly 10 is inserted into a pipeline system (not shown) which carries the flowing material, the material enters sensor assembly 10 through flange 101, passes through the inlet manifold 102 where the total amount of material is directed to enter conduits 103A and 103B, flows through the conduits 103A and 103B and back into the outlet manifold 102' where it exits the sensor assembly 10 through the flange 101'.

The prior art sensor assembly 10 includes a driver 104. The driver 104 is affixed to conduits 103A and 103B in a position where the driver 104 can vibrate the conduits 103A, 103B in the drive mode, for example. More particularly, the driver 104 includes a first driver component 104A affixed to the conduit 103A and a second driver component 104B affixed to the conduit 103B. The driver 104 may comprise one of many well-known arrangements such as a coil mounted to the conduit 103A and an opposing magnet mounted to the conduit 103B.

In the present example of the prior art Coriolis flow meter, the drive mode is the first out of phase bending mode and the conduits 103A, 103B are selected and appropriately mounted to inlet manifold 102 and outlet manifold 102' so as to provide a balanced system having substantially the same mass distribution, moments of inertia, and elastic modules about bending axes W-W and W'-W', respectively. In the present example, where the drive mode is the first out of phase bending mode, the conduits 103A and 103B are driven by the driver 104 in opposite directions about their respective bending axes W-W and W'-W'. A drive signal in the form of an alternating current can be provided by the meter electronics 20, such as for example via pathway 110, and passed through the coil to cause both conduits 103A, 103B to oscillate. Those of ordinary skill in the art will appreciate that other drive modes may be used by the prior art Coriolis flow meter.

The sensor assembly 10 shown includes a pair of pick-offs 105, 105' that are affixed to the conduits 103A, 103B. More particularly, first pick-off components 105A and 105'A are located on the first conduit 103A and second pick-off components 105B and 105'B are located on the second conduit 103B. In the example depicted, the pick-offs 105, 105' may be electromagnetic detectors, for example, pick-off magnets and pick-off coils that produce pick-off signals that represent the velocity and position of the conduits 103A, 103B. For example, the pick-offs 105, 105' may supply pick-off signals to the meter electronics 20 via pathways 111, 111'. Those of ordinary skill in the art will appreciate that the motion of the conduits 103A, 103B is generally proportional to certain characteristics of the flowing material, for example, the mass flow rate and the density of the material flowing through the conduits 103A, 103B. However, the motion of the conduits 103A, 103B also includes a zero-flow delay or offset that can be measured at the pick-offs 105, 105'. The zero-flow offset can be caused by a number of factors such as non-proportional damping, residual flexibility response, electromagnetic crosstalk, or phase delay in instrumentation.

In many prior art fluid meters, the zero-flow offset is typically corrected for by measuring the offset at zero-flow conditions and subtracting the measured offset from subsequent measurements made during flow. While this approach provides an adequate flow measurement when the zero-flow offset remains constant, in actuality the offset changes due to a variety of factors including small changes in the ambient environment (such as temperature) or changes in the piping system through which the material is flowing. As can be appreciated any change in the zero-flow offset results in an error in the determined flow characteristics. During normal operations, there may be long periods of time between no-flow conditions. The changes in the zero-flow offset over time may cause significant errors in the measured flow.

The present applicants have developed a method for determining and correcting for changes in the zero-flow offset during flow, which is described in U.S. Pat. No. 7,706,987 entitled "In-Flow Determination Of Left And Right Eigenvectors In A Coriolis Flowmeter" and is hereby incorporated by reference. This so-called "Direct Coriolis Measurement" (DICOM) used in the '987 patent explains that if two or more drivers are used rather than the typical single driver system, the left and right eigenvectors of the Coriolis flow meter system can be determined. In the physical sense, the right eigenvectors determine the phase between response points (pick-offs) when a particular mode is excited. The right eigenvectors are the values typically measured and determined in vibrating flow meters, such as the prior art flow meter 5. The left eigenvectors determine the phase between drivers that optimally excite a particular mode. Without a zero-flow offset, these two phases are the same. Consequently, as outlined in the '987 patent, if the left and right eigenvectors can be determined, the zero-flow offset can be distinguished from the fluid flow.

Although DICOM allows for increased accuracy in flow measurements by allowing in-flow determination of the zero-flow offset, the present applicants have discovered that the DICOM requires collocated sensor components. Although the '987 patent describes the use of collocated sensor components, in actuality, the '987 patent utilizes two separate and distinct driver sensor components and two separate and distinct pick-off sensor components. The '987 patent attempts to position the driver and pick-off sensor components directly across from one another on the flow conduit to provide collocation. However, because the driver and pick-off sensor components are individually attached to the flow conduits 103A, 103B, precise collocation is impractical and even a small misplacement can result in errors propagating throughout the flow measurement.

U.S. Pat. No. 6,230,104, which is assigned on its face to the present applicants, discloses a combined driver and pick-off sensor. The combined driver and pick-off sensor disclosed in the '104 patent can be used to reduce the number of sensor components, which reduces the wiring and consequently, the cost. Additionally, the combined driver and pick-off sensor can be used to perform DICOM. However, due to the configuration of the combined sensor component disclosed in the '104 patent, measurements are complex and require an excessive amount of power. Further, the configuration disclosed in the '104 patent is easily rendered inaccurate. The '104 patent uses the same coil to apply the drive signal and receive the pick-off signal. This dual use of the coil requires a complex separation of the back electromotive force (back-EMF), which is the desired velocity measurement, from the measured transducer voltage applied by the drive signal. The determination of the back-EMF with the combined sensor component shown in the '104 patent requires at least two compensations. The back-EMF can be characterized by equation (1).

$$V_{bEMF} = V_{total} - Ri - L\frac{di}{dt} \quad (1)$$

Where:

$V_{bEMF}$ is the back-$EMF$;

$V_{total}$ is the total measured pick-off voltage;

$Ri$ is the resistive load; and $L\frac{di}{dt}$ is the inductive load.

The resistive load varies with temperature, thereby requiring on-line resistance calculation. Errors in this compensation affect both drive stability and flow measurement. Further, the resistive load is typically larger than the other terms in equation (1). Consequently, even small errors in the resistive load can translate to large flow errors. The inductive load is typically much smaller than the resistive load, but small errors here still become significant flow measurement offsets.

Therefore, as can be appreciated, the combined driver and pick-off sensor disclosed in the '104 patent does not provide a suitable solution. There exists a need in the art for a combined driver and pick-off sensor that is collocated and can determine measurements with reduced complexity. The embodiments described below overcome these and other problems and an advance in the art is achieved.

SUMMARY OF THE INVENTION

A combined driver and pick-off sensor component for a vibrating meter is provided according to an embodiment. The combined driver and pick-off sensor component comprises a magnet portion comprising at least a first magnet and a coil portion. According to an embodiment, the coil portion comprises a coil bobbin, a driver wire wound around the coil bobbin, and a pick-off wire wound around the coil bobbin.

A vibrating meter is provided according to an embodiment. The vibrating meter comprises a meter electronics and a sensor assembly in electrical communication with the meter electronics. According to an embodiment, the sensor assembly includes one or more flow conduits and one or more combined driver and pick-off sensor components coupled to at least one of the one or more flow conduits. Each of the combined driver and pick-off sensor components comprises a magnet portion and a coil portion. According to an embodiment, the coil portion includes a coil bobbin, a driver coil wound around the coil bobbin, and a pick-off wire wound around the coil bobbin.

A method for forming a vibrating meter including a sensor assembly with one or more flow conduits is provided according to an embodiment. The method comprises steps of winding a driver wire around a coil bobbin and winding a pick-off wire around the coil bobbin. According to an embodiment, the method further comprises coupling the coil bobbin to one of the one or more flow conduits. According to an embodiment, the method further comprises electrically coupling the driver wire to a meter electronics for communicating a drive signal and electrically coupling the pick-off wire to the meter electronics for communicating a pick-off signal.

Aspects

According to an aspect, a combined driver and pick-off sensor component for a vibrating meter comprises:
a magnet portion comprising at least a first magnet;
a coil portion including:
a coil bobbin;
a driver wire wound around the coil bobbin; and
a pick-off wire wound around the coil bobbin.

Preferably, the pick-off wire is wound on top of at least a portion of the driver wire.

Preferably, the coil bobbin comprises a first winding area for receiving the driver wire and a second winding area for receiving the pick-off wire.

Preferably, the first and second winding areas are spaced apart from one another.

Preferably, the combined driver and pick-off sensor component further comprises a flux directing ring positioned between the first and second winding areas.

Preferably, the coil bobbin comprises a magnet receiving portion for receiving at least a portion of the magnet.

Preferably, the first magnet corresponds to the driver wire and the magnet portion further comprises a second magnet coupled to the first magnet corresponding to the pick-off wire.

According to another aspect, a vibrating meter comprises:
a meter electronics;
a sensor assembly in electrical communication with the meter electronics and including:
one or more flow conduits; and
one or more combined driver and pick-off sensor components coupled to at least one of the one or more flow conduits with each of the combined driver and pick-off sensor components comprising a magnet portion and a coil portion, wherein the coil portion includes a coil bobbin, a driver wire wound around the coil bobbin, and a pick-off wire wound around the coil bobbin.

Preferably, the vibrating meter further comprises a first electrical lead coupled to the driver wire and in electrical communication with the meter electronics for communicating a drive signal and a second electrical lead coupled to the pick-off wire and in electrical communication with the meter electronics for communicating a pick-off signal.

Preferably, the magnet portion comprises at least a first magnet.

Preferably, the coil bobbin comprises a magnet receiving portion for receiving at least a portion of the first magnet.

Preferably, the pick-off wire is wound on top of at least a portion of the driver wire.

Preferably, the coil bobbin comprises a first winding area for receiving the driver wire and a second winding area for receiving the pick-off wire.

Preferably, the first and second winding areas are spaced apart from one another.

Preferably, the vibrating meter further comprises a flux directing ring positioned between the first and second winding areas.

According to another aspect, a method for forming a vibrating meter including a sensor assembly with one or more flow conduits comprises steps of:
winding a driver wire around a coil bobbin;
winding a pick-off wire around the coil bobbin;
coupling the coil bobbin to one of the one or more flow conduits;
electrically coupling the driver wire to a meter electronics for communicating a drive signal; and
electrically coupling the pick-off wire to the meter electronics for communicating a pick-off signal.

Preferably, the method further comprises a step of coupling a magnet to a second flow conduit of the one or more flow conduits such that the coil bobbin receives at least a portion of the magnet.

Preferably, the step of winding the pick-off wire comprises winding the pick-off wire on top of the driver wire.

Preferably, the step of winding the driver and pick-off wires comprises winding the driver wire in a first winding area and winding the pick-off wire in a second winding area spaced from the first winding area.

Preferably, the method further comprises a step of coupling a flux directing ring to the coil bobbin between the first and second winding areas.

DETAILED DESCRIPTION OF THE INVENTION

Figure 2:
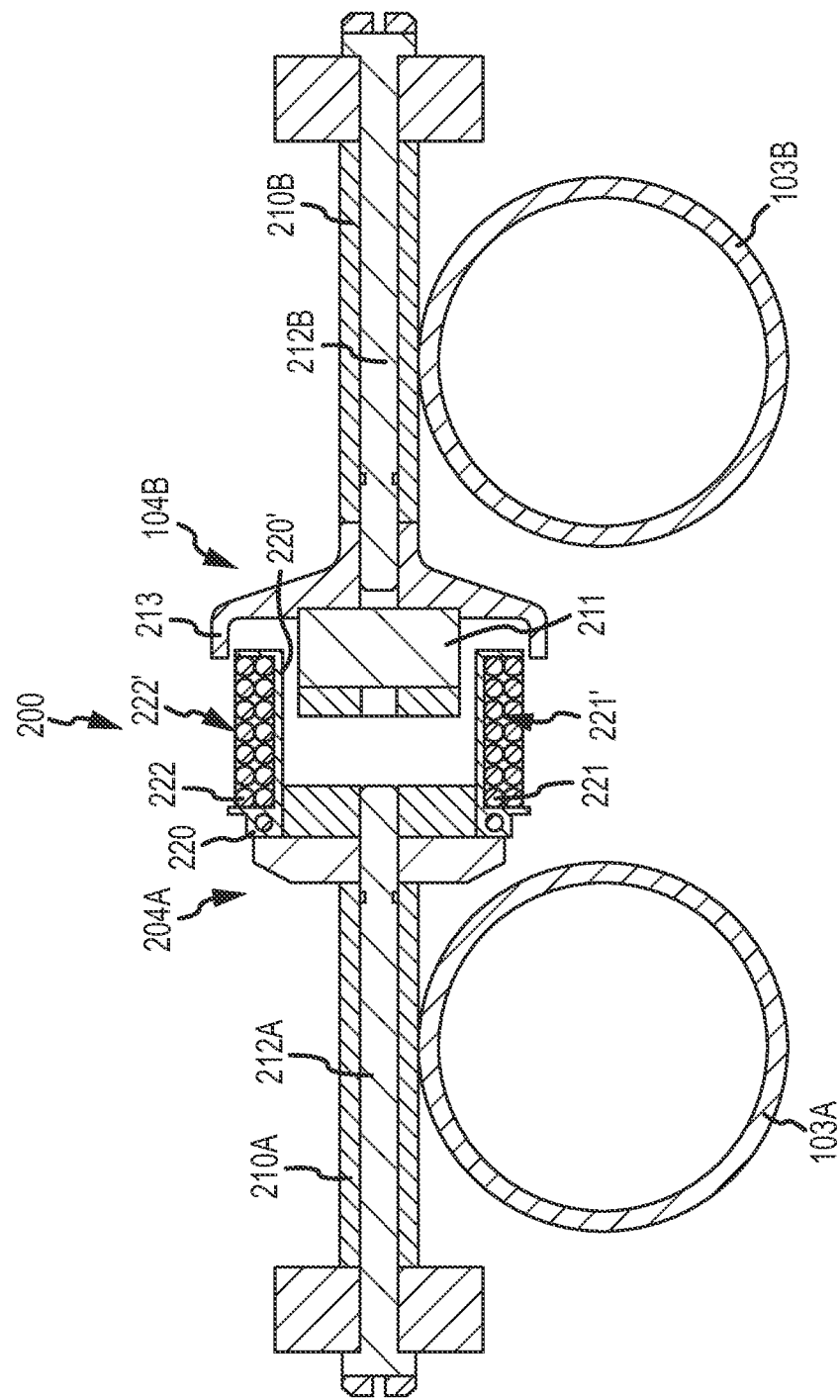
FIG. 2 shows a cross-sectional view of a combined sensor component according to an embodiment.
Figure 3:
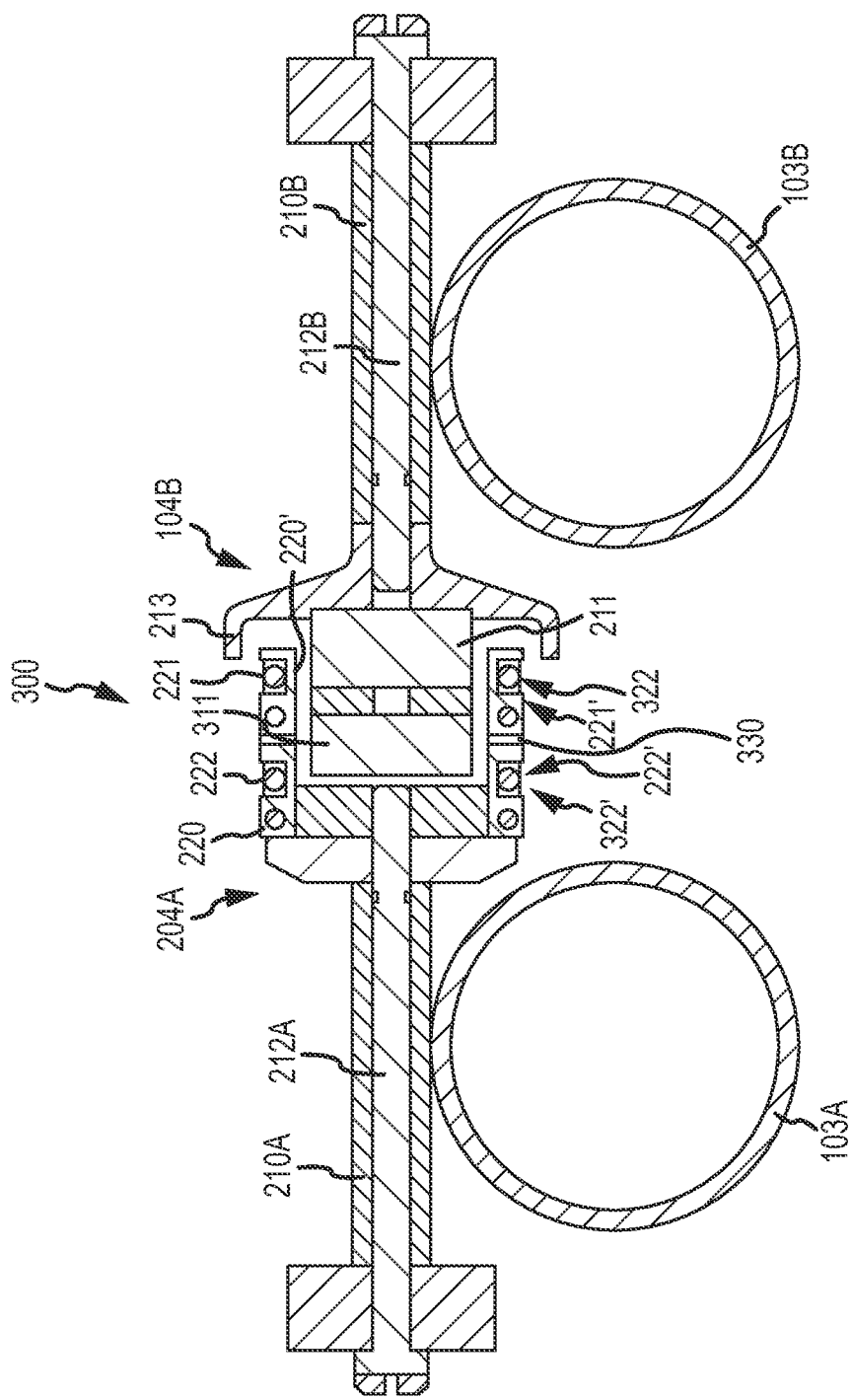
FIG. 3 shows a cross-sectional view of a combined sensor component according to another embodiment.

FIGS. 2-3 and the following description depict specific examples to teach those skilled in the art how to make and use the best mode of embodiments of a support member. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the fluid meter. As a result, the embodiments described below are not limited to the specific examples described below, but only by the claims and their equivalents.

FIG. 2 shows a cross-sectional view of a combined sensor component 200 according to an embodiment. According to the embodiment shown, the combined sensor component 200 comprises a combined driver and a pick-off sensor component. According to an embodiment, the combined driver and pick-off sensor component can be coupled to the first and second flow conduits 103A, 103B. In the embodiment shown, the combined sensor component 200 is coupled to the first and second flow conduits 103A, 103B using mounting brackets 210A, 210B. Therefore, the combined sensor component 200 can replace one or more of the sensor components 104, 105, 105' of the prior art flow meter 5 shown in FIG. 1. In some embodiments, two combined sensor components 200 may be used to replace the pick-off sensors 105, 105' while the driver 104 can be eliminated. Thus, the use of the combined sensor component 200 can reduce the number of total sensor components required for an operational fluid meter.

According to an embodiment, the combined sensor component 200 comprises a coil portion 204A and a magnet portion 104B. The magnet portion 104B comprises a magnet 211 that is held onto the mounting bracket 210B using a bolt 212B. The magnet 211 can be positioned within a magnet keeper 213 that can help direct the magnetic field. According to an embodiment, the magnet portion 104B comprises a typical magnet portion of prior art sensor components. The mounting bracket 210B is shown coupled to the second flow conduit 103B. The mounting bracket 210B may be coupled to the flow conduit 103B according to well-known techniques such as welding, brazing, bonding, etc.

According to an embodiment, the coil portion 204A is coupled to the first flow conduit 103A with the mounting bracket 210A. The mounting bracket 210A may be coupled to the flow conduit 103A according to well-known techniques such as welding, brazing, bonding, etc. The coil portion 204A also comprises a coil bobbin 220. The coil bobbin 220 can include a magnet receiving portion 220' for receiving at least a portion of the magnet 211. The coil bobbin 220 can be held onto the mounting bracket 210A with a bolt 212A or similar fastening device. The particular method used to couple the coil portion 204A to the flow conduit 103A should in no way limit the scope of the present embodiment.

Additionally, while the combined driver and pick-off sensor component 200 is shown being coupled to a dual flow conduit sensor assembly, in other embodiments, one of the portions 104B, 204A may be coupled to a stationary component or a dummy tube, for example. This may be the case in situations where the combined driver and pick-off sensor component 200 is utilized in a single flow conduit sensor assembly.

According to an embodiment, the coil portion 204A collocates the driver wire 221 and the pick-off wire 222. Unlike the prior art combined sensor component described in the '104 patent, the combined sensor component of the present embodiment provides separate and distinct wires 221, 222. However, according to the embodiment shown in FIG. 2, the driver wire 221 and the pick-off wire 222 are both wound around the same coil bobbin 220. Winding the driver wire 221 and the pick-off wire 222 around the coil bobbin 220 creates a driver coil 221' and a pick-off coil 222', which are collocated. In the embodiment shown, the wires 221, 222 are stacked on top of one another, i.e., one wire is wound on top of the other. While the embodiment shows the driver wire 221 being wound on the bobbin 220 prior to the pick-off wire 222, the reverse could also be utilized, wherein the pick-off wire 222 is positioned radially inward of the driver wire 221.

According to an embodiment, an insulating layer (not shown) may be provided between the driver wire 221 and the pick-off wire 222. However, such an insulating layer is not necessary.

As shown, both coils share a single magnet 211 and a single magnet keeper 213. Consequently, the number of components required to form a combined sensor component 200 is substantially reduced.

The combined sensor component 200 provides a significant advantage over the combined sensor shown in the '104 patent. The combined sensor component 200 substantially eliminates the resistive compensation that is required by the '104 patent as the driver wire 221 is different from the pick-off wire 222. Therefore, the back-EMF calculation has been simplified to equation (2).

$$V_{bEMF} = V_{total} - M \frac{di}{dt} \quad (2)$$

Where:
M is the mutual inductance between the two coils 221', 222'.

As can be appreciated, with the resistive compensation removed from the equation, the determination of the back-EMF is substantially simplified. Further, an online temperature measurement is no longer required. Also, recall from above that the resistive compensation is typically much larger than the inductive compensation. Therefore, the compensation required by equation (2) results in smaller flow measurement errors.

Figure 1:
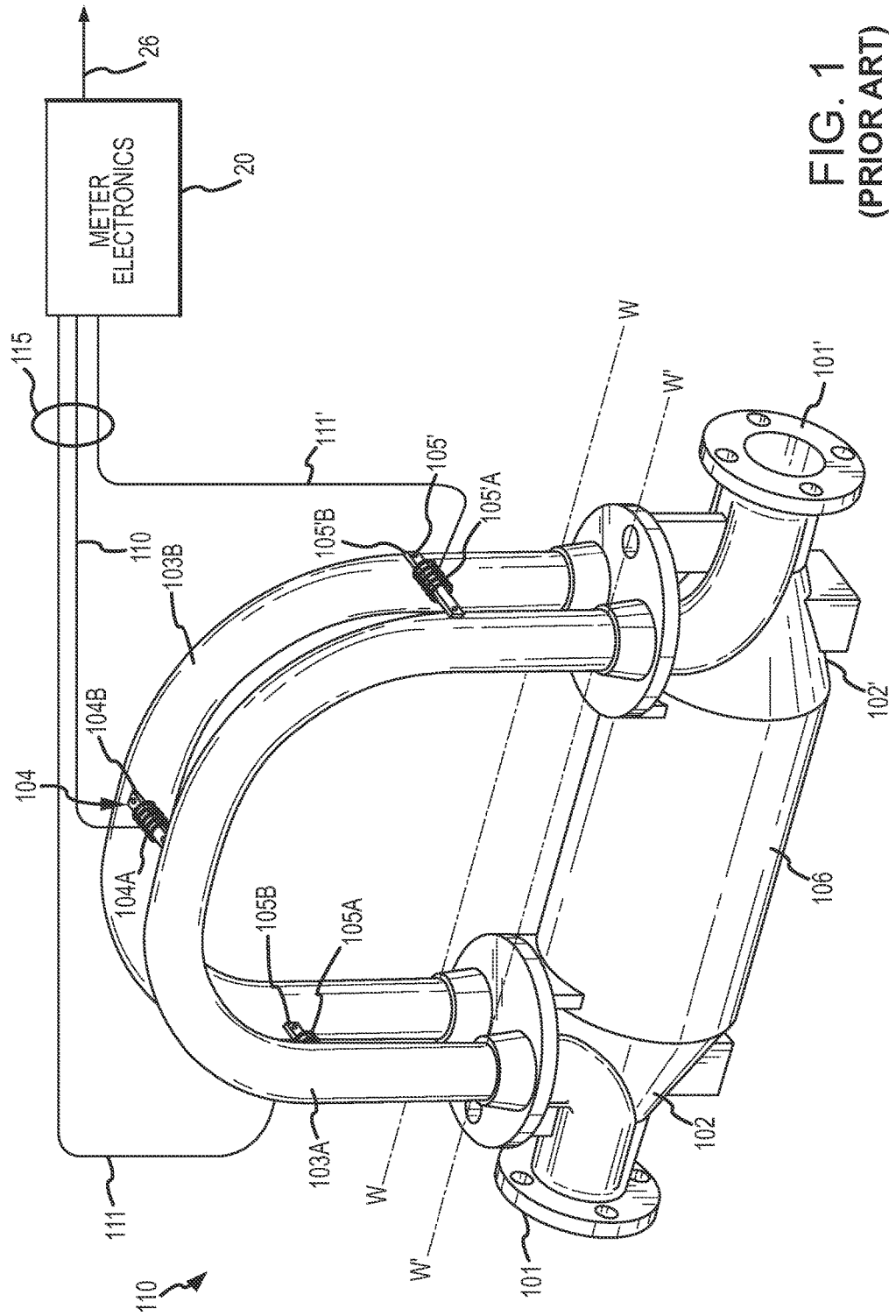
FIG. 1 shows a prior art fluid meter.

Although not shown in FIG. 2, it should be appreciated that the meter electronics 20 can communicate with the driver wire 221 with a wire lead (See FIG. 4) similar to the wire lead 110 shown in FIG. 1. Therefore, when in electrical communication with the meter electronics, the driver wire 221 can be provided with a drive signal in order to create motion between the coil portion 204A and the magnet portion 104B. Likewise, the pick-off wire 221 can communicate with the meter electronics 20 with a wire lead (See FIG. 4) similar to one of the wire leads 111, 111'. Therefore, when in electrical communication with the meter electronics, the pick-off wire 222 can sense motion between the coil portion 204A and the magnet portion 104B and provide a pick-off signal to the meter electronics. Therefore, the combined sensor component 200 does not require the complex circuitry and mimetic circuit as required by the system disclosed in the '104 patent.

FIG. 3 shows a cross-sectional view of a combined sensor component 300 according to an embodiment. The embodiment shown in FIG. 3 is similar to the embodiment shown in FIG. 2 except that rather than winding the pick-off wire 222 on top of the driver wire 221, the two wires are spaced from one another, while remaining wound around the same bobbin 222. Therefore, the bobbin 222 comprises a first winding area 322 and a second winding area 322'. According to an embodiment, the first and second winding areas 322, 322' are spaced from one another. The winding areas 322, 322' may comprise grooves formed in the coil bobbin 222 in order to receive a wire. According to the embodiment shown, the driver and pick-off wires 221, 222 are further separated by a flux directing ring 330. The flux directing ring 330 may be formed from carbon steel or some other mu metal and coupled to the coil bobbin 222 between the first and second winding areas 322, 322'. The flux directing ring 330 can help in isolating the electric fields associated with the individual wires 221, 222. The flux directing ring 330 can direct the flux lines from the driver wire 221 away from the pick-off wire 222.

Although the driver wire 221 is shown positioned closer to the magnet portion 104B, in other embodiments, the pick-off wire 222 can be positioned closer to the magnet portion 104B. Therefore, the present embodiment should not be limited to the configuration shown in FIG. 3.

According to an embodiment, the combined sensor component 300 eliminates the resistive compensation as in the combined sensor component 200, but also with the combined sensor component 300, the mutual inductance from equation (2) is small enough that any errors in the compensation of equation (2) are minimal. Consequently, the back-EMF of the pick-off wire 222 can be measured directly as if the pick-off wire 222 were located on a separate sensor component as in the prior art.

Advantageously, the combined sensor component 300 provides a collocated sensor component with the measurement simplicity of a stand-alone sensor component. The combined sensor components 200, 300 may be used in Coriolis flow meter in order to reduce the number of sensor components required. With the combined sensor components, the number of sensor components can be reduced from three (FIG. 1) to two. This results in a reduction in material costs, assembly time, and less wiring. Additionally, the use of the combined sensor components 200, 300 ensure collocation of a driver wire 221 and a pick-off wire 222. Therefore, use of either the combined sensor component 200 or the combined sensor component 300 improves the accuracy of measurements obtained using DICOM.

As with the combined sensor component 200 shown in FIG. 2, the driver wire 221 and the pick-off wire 222 can share the same magnet 211. However, in the embodiment shown, the magnet portion 104B comprises a second magnet 311. The second magnet 311 can be coupled to the first magnet 211 and can be used to primarily interact with the pick-off wire 222. This is because in the combined sensor component 300, the pick-off wire 222 is positioned further away from the first magnet 211 and consequently, better performance can be achieved if the second magnet 311 is used that is positioned closer to the pick-off wire 222 during use.

Figure 4:
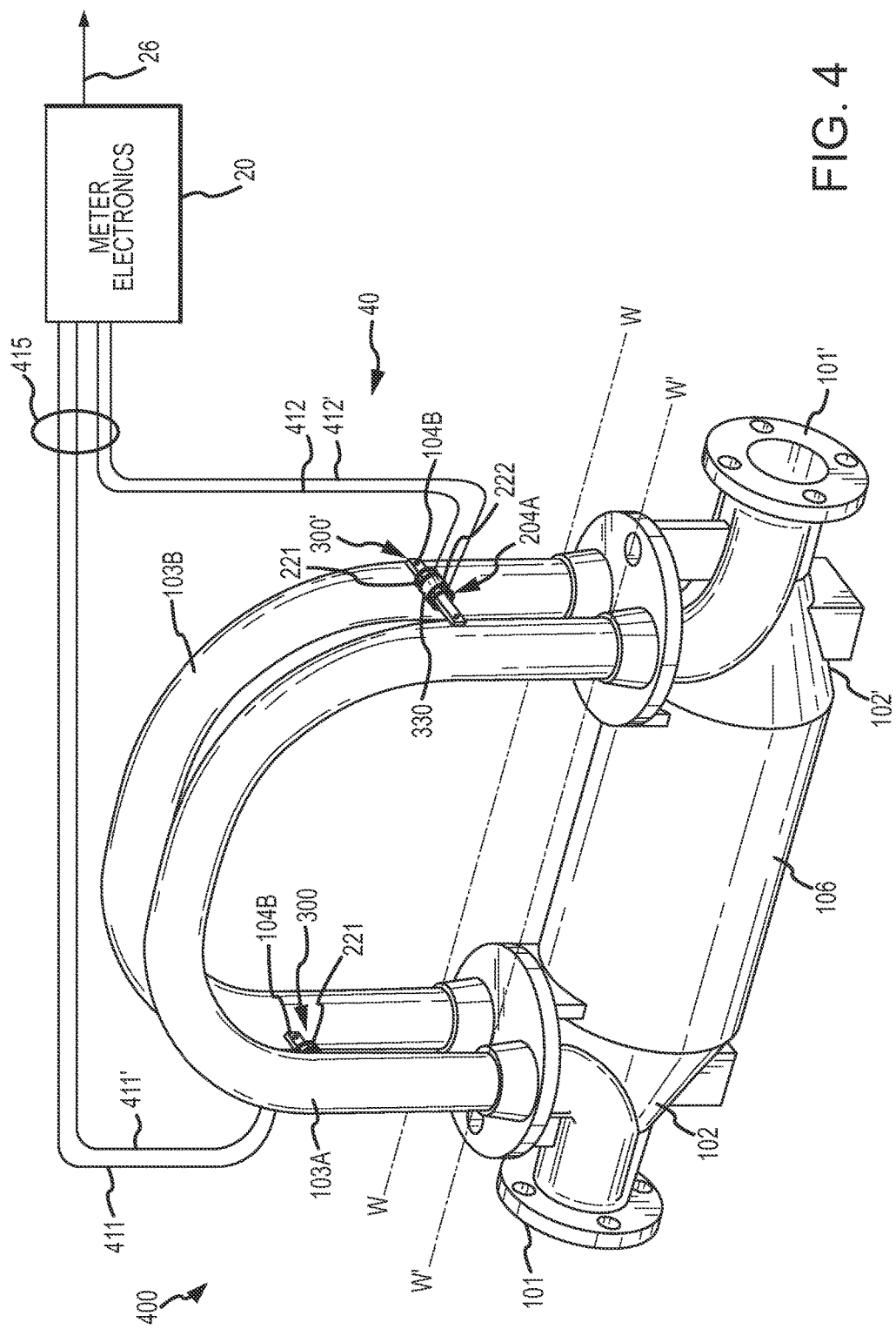
FIG. 4 shows a vibrating meter 400 according to an embodiment.

FIG. 4 shows a vibrating meter 400 according to an embodiment. The vibrating meter 400 is similar to the meter 5 shown in FIG. 1 and like components share the same reference number. The vibrating meter 400 may comprise a Coriolis flow meter or some other fluid meter. Therefore, the vibrating meter 400 comprises a sensor assembly 40 and the meter electronics 20. The sensor assembly 40 can receive a fluid. The fluid may be flowing or stationary. The fluid may comprise a gas, a liquid, a gas with suspended particulates, a liquid with suspended particulates, or a combination thereof.

The sensor assembly 40 is in electrical communication with the meter electronics 20 via leads 415. According to the embodiment shown, the vibrating meter 400 utilizes the combined sensor components 300; however, in other embodiments, the combined sensor components 200 may be used. As shown in FIG. 4, the vibrating meter 400 has reduced the number of sensor components from three to two. Therefore, the manufacturing process is substantially simplified. Further, the vibrating meter 400 may be used for DICOM operations.

According to the embodiment shown, a first combined sensor component 300 is coupled at the inlet end of the flow conduits 103A, 103B while a second combined sensor component 300 is shown coupled at the outlet end of the flow conduits 103A, 103B. In the embodiment shown, the first combined sensor component 300 is in electrical communication with the meter electronics 20 via a first wire lead 411 and a second wire lead 411'. More specifically, the driver wire 221 of the first combined sensor component 300 is coupled to the first wire lead 411 while the pick-off wire 222 is coupled to the second wire lead 411'. Similarly, the second combined sensor component 300 is in electrical communication with the meter electronics 20 via a third wire lead 412 and a fourth wire lead 412'. More specifically, the driver wire 221 of the second combined sensor component 300 is coupled to the third wire lead 412 while the pick-off wire 222 is coupled to the fourth wire lead 412'.

Advantageously, the meter electronics 20 can provide a drive signal to one or both of the driver coils via leads 411, 412 and receive pick-off signals from the pick-off coils via leads 411', 412' as is generally known in the art.

The embodiments described above provide an improved collocated sensor component for a vibrating meter. The improved collocated sensor component comprises a combined driver and pick-off sensor component. In order to ensure collocation of the driver and pick-off coils 221', 222', the driver and pick-off wires 221, 222 are wound around the same coil bobbin 220. Advantageously, in embodiments where the collocated sensor component is used for DICOM, collocation of the driver and sensor components does not have to be assumed or estimated. Rather, the combined driver and pick-off sensor components 200, 300 ensure that collocation is achieved.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other fluid meters, and not just to the embodiments described above and shown in the accompanying figures. Accordingly, the scope of the embodiments should be determined from the following claims.

We claim:

1. A combined driver and pick-off sensor component (200, 300) for a vibrating meter, comprising:
    a magnet portion (104B) comprising at least a first magnet (211);
    a coil portion (204A, 304A) including:
        a coil bobbin (220);
        a driver wire (221) wound around the coil bobbin (220); and
        a pick-off wire (222) wound around the coil bobbin (220), wherein the driver wire (221) and the pick-off wire (222) are separate and distinct.

2. The combined driver and pick-off sensor component (200, 300) of claim 1, wherein the pick-off wire (222) is wound on top of at least a portion of the driver wire (221).

3. The combined driver and pick-off sensor component (200, 300) of claim 1, wherein the coil bobbin (220) comprises a first winding area (322) for receiving the driver wire (221) and a second winding area (322') for receiving the pick-off wire (222).

4. The combined driver and pick-off sensor component (200, 300) of claim 3, wherein the first and second winding areas (322, 322') are spaced apart from one another.

5. The combined driver and pick-off sensor component (200, 300) of claim 4, further comprising a flux directing ring (330) positioned between the first and second winding areas (322, 322').

6. The combined driver and pick-off sensor component (200, 300) of claim 1, wherein the coil bobbin (220) comprises a magnet receiving portion (220') for receiving at least a portion of the magnet (211).

7. The combined driver and pick-off sensor component (200, 300) of claim 1, wherein the first magnet (211) corresponds to the driver wire (221) and the magnet portion (104B) further comprises a second magnet (311) coupled to the first magnet (211) corresponding to the pick-off wire (222).

8. A vibrating meter (400), comprising:
a meter electronics (20);
a sensor assembly (40) in electrical communication with the meter electronics (20) and including:
one or more flow conduits (103A, 103B); and
one or more combined driver and pick-off sensor components (200, 300) coupled to at least one of the one or more flow conduits (103A, 103B) with each of the combined driver and pick-off sensor components comprising a magnet portion (104B) and a coil portion (204A), wherein the coil portion (204A) includes a coil bobbin (220), a driver wire (221) wound around the coil bobbin (220), and a pick-off wire (222) wound around the coil bobbin (220), wherein the driver wire (221) and the pick-off wire (222) are separate and distinct.

9. The vibrating meter (400) of claim 8, further comprising a first electrical lead (411) coupled to the driver wire (221) and in electrical communication with the meter electronics (20) for communicating a drive signal and a second electrical lead (411') coupled to the pick-off wire (222) and in electrical communication with the meter electronics (20) for communicating a pick-off signal.

10. The vibrating meter (400) of claim 8, wherein the magnet portion (104B) comprises at least a first magnet (211).

11. The vibrating meter (400) of claim 10, wherein the coil bobbin (220) comprises a magnet receiving portion (220') for receiving at least a portion of the first magnet (211).

12. The vibrating meter (400) of claim 8, wherein the pick-off wire (222) is wound on top of at least a portion of the driver wire (221).

13. The vibrating meter (400) of claim 8, wherein the coil bobbin (220) comprises a first winding area (322) for receiving the driver wire (221) and a second winding area (322') for receiving the pick-off wire (222).

14. The vibrating meter (400) of claim 13, wherein the first and second winding areas (322, 322') are spaced apart from one another.

15. The vibrating meter (400) of claim 14, further comprising a flux directing ring (330) positioned between the first and second winding areas (322, 322').

16. A method for forming a vibrating meter including a sensor assembly with one or more flow conduits, comprising steps of:
winding a driver wire around a coil bobbin;
winding a pick-off wire around the coil bobbin, wherein the driver wire and the pick-off wire and separate and distinct;
coupling the coil bobbin to one of the one or more flow conduits;
electrically coupling the driver wire to a meter electronics for communicating a drive signal; and
electrically coupling the pick-off wire to the meter electronics for communicating a pick-off signal.

17. The method of claim 16, further comprising a step of coupling a magnet to a second flow conduit of the one or more flow conduits such that the coil bobbin receives at least a portion of the magnet.

18. The method of claim 16, wherein the step of winding the pick-off wire comprises winding the pick-off wire on top of the driver wire.

19. The method of claim 16, wherein the step of winding the driver and pick-off wires comprises winding the driver wire in a first winding area and winding the pick-off wire in a second winding area spaced from the first winding area.

20. The method of claim 19, further comprising a step of coupling a flux directing ring to the coil bobbin between the first and second winding areas.

* * * * *